(12) United States Patent
Kavanagh (10) Patent No.: US 7,796,383 B2
(45) Date of Patent: Sep. 14, 2010

(54) HEAT TRANSFER APPARATUS

(75) Inventor: Martin Kavanagh, Oldham (GB)

(73) Assignee: Digital Protection Limited

( * ) Notice: Subject to any disclaimer, the term of this patent is extended or adjusted under 35 U.S.C. 154(b) by 0 days.

(21) Appl. No.: 12/221,967

(22) Filed: Aug. 8, 2008

(65) Prior Publication Data
US 2009/0046425 A1 Feb. 19, 2009

(51) Int. Cl.
*H05K 7/20* (2006.01)
(52) U.S. Cl. ............. 361/690; 361/679.46; 361/679.49; 361/679.54; 361/709; 361/710; 165/80.2; 165/80.3; 165/104.33; 165/104.34; 165/185; 353/31; 353/52; 359/291; 359/290
(58) Field of Classification Search ............ 361/679.46, 361/679.49, 679.54, 688, 689, 690–697, 361/702–712, 717–722; 165/80.3, 104.21, 165/104.33, 185; 257/706–727, 682–689, 257/787; 174/15.1, 16.3, 252; 359/152, 359/290, 223, 224, 237, 242, 224.1, 298, 359/623, 629, 245, 254, 291; 362/294, 373, 362/127; 353/52, 54, 57, 61, 58, 84, 31, 353/75; 29/830, 837, 840; 345/100
See application file for complete search history.

(56) References Cited

U.S. PATENT DOCUMENTS

| 3,195,628 | A | * | 7/1965 | McAdam ................... 165/185 |
| 5,022,462 | A | * | 6/1991 | Flint et al. .................. 165/80.4 |
| 5,852,339 | A | | 12/1998 | Hamilton et al. |
| 5,867,202 | A | * | 2/1999 | Knipe et al. ................. 347/239 |
| 5,978,228 | A | | 11/1999 | Borkar et al. |
| 6,244,332 | B1 | | 6/2001 | Gesklin et al. |
| 6,334,686 | B1 | * | 1/2002 | Shiraishi et al. .............. 353/57 |
| 6,411,513 | B1 | * | 6/2002 | Bedard ....................... 361/704 |
| 6,413,353 | B2 | | 7/2002 | Pompeo et al. |
| 6,687,125 | B2 | | 2/2004 | Park et al. |
| 6,711,015 | B2 | | 3/2004 | Syring et al. |
| 6,774,482 | B2 | | 8/2004 | Colgan et al. |
| 6,856,446 | B2 | * | 2/2005 | DiCarlo ...................... 359/291 |
| 6,870,660 | B2 | * | 3/2005 | DiCarlo ...................... 359/291 |
| 6,914,783 | B2 | * | 7/2005 | Rogers et al. ................ 361/709 |
| 6,967,839 | B2 | * | 11/2005 | Chung et al. ................ 361/695 |
| 7,021,768 | B2 | * | 4/2006 | Fuse et al. .................... 353/61 |
| 7,063,127 | B2 | | 6/2006 | Gelorme et al. |
| 7,230,334 | B2 | | 6/2007 | Andry et al |
| 7,301,770 | B2 | * | 11/2007 | Campbell et al. ........... 361/699 |

(Continued)

FOREIGN PATENT DOCUMENTS

DE 19515122 A1 10/1996

(Continued)

OTHER PUBLICATIONS

Search Report—EPO, Dec. 23, 2008, Kavanagh.

*Primary Examiner*—Michael V Datskovskiy
(74) *Attorney, Agent, or Firm*—Robert C. Klinger (57) ABSTRACT

The present application relates to apparatus (100) for cooling a light valve device (103), the apparatus comprising an array of elongate members (119), the elongate members (119) each having a tip (131) for contacting the light valve device (103). The apparatus (100) is suitable for cooling a digital micromirror device (103). A duct (117) may be provided for directing a flow of air from a fan to the light valve device (103).

18 Claims, 10 Drawing Sheets

U.S. PATENT DOCUMENTS

| | | |
|---|---|---|
| 2002/0043360 A1 | 4/2002 | Lee |
| 2003/0085659 A1* | 5/2003 | Overmann et al. ............ 315/32 |
| 2004/0190245 A1* | 9/2004 | Tirumala et al. ............ 361/690 |
| 2004/0263799 A1 | 12/2004 | Lim |
| 2005/0012905 A1 | 1/2005 | Morinaga |
| 2005/0073811 A1 | 4/2005 | Wang et al. |
| 2005/0139346 A1* | 6/2005 | Huang et al. ........... 165/104.21 |
| 2005/0179873 A1 | 8/2005 | Yamasaki et al. |
| 2006/0146293 A1 | 7/2006 | Morimoto et al. |
| 2007/0025107 A1* | 2/2007 | Kavanagh .................. 362/294 |
| 2007/0157627 A1* | 7/2007 | Hsu ............................. 62/3.2 |

FOREIGN PATENT DOCUMENTS

| | | |
|---|---|---|
| EP | 0938009 | 1/1999 |
| EP | 1731957 | 12/2006 |
| JP | 410319381 A * | 12/1998 |
| JP | 02000098491 A * | 4/2000 |
| JP | 2005 241969 A | 8/2005 |
| JP | 2006 11114 A | 1/2006 |
| WO | WO 93/25332 * | 12/1993 |
| WO | WO2004/057406 | 7/2004 |

* cited by examiner

HEAT TRANSFER APPARATUS

FIELD OF THE INVENTION

The present invention relates to apparatus for cooling a light valve device. More specifically, the present invention relates to apparatus for cooling a digital micro-mirror device.

BACKGROUND OF THE INVENTION

Large screen images, particularly moving ones, have been captivating people's imagination ever since the Lumiere brothers showed their 'cinema' images in 1895. For almost the next 100 years, the predominant technology for large screen moving images was using projected motion picture film. Because of the costs involved in producing Cinema film prints for distribution, together with the fact that motion picture film is easily damaged, other technologies were investigated in which the film or picture and sound information was stored digitally. This involved the development of electronic projection technologies. These technologies consisted primarily of LCD (Liquid Crystal Display) techniques and DMD (Digital Micro-mirror Device) Techniques. It is in relation to this second technology that we have made significant improvements.

Digital Micro-mirror Devices (DMDs) are a light valve first proposed by Dr. Larry Hornbeck and Dr. William E. Nelson of Texas Instruments (TI) in 1987.

A DMD is provided with several hundred thousand or indeed several million hingedly mounted microscopic mirrors. The mirrors are arranged in an array and each mirror corresponds to a pixel in the display image. The mirrors can be tilted independently towards the light source in a projection system (ON) or away from the light source (OFF) to create a light or dark pixel on the projection surface.

To display a grey scale pixel, the mirrors may be toggled on and off quickly, typically several thousand times each second. A light grey pixel is displayed if the mirror is on more than it is off; and, conversely, a dark grey pixel is displayed if the mirror is off more than it is on. A contemporary DMD may produce up to 1024 shades of gray.

A single-chip DMD may be used in conjunction with a colour filter wheel to enable colour images to be projected. Alternatively, multiple DMDs may be provided, each DMD handling a separate colour. A professional system may contain three DMDs each dedicated to handling a separate colour (red, green or blue).

Projection systems based on DLP technology were first demonstrated in 1993 and have been commercially available since around 1996, and typical models of projector are those designed and manufactured by the applicant, such as the 'Lightning Pro' series of projectors.

For consumer purposes, the manufacturers, Texas Instruments Inc, of Dallas, Tex., USA, have produced chips which conform to the likely domestic standard of 1080p (indicating a vertical resolution of 1080 lines, progressively displayed, and of 1920 elements per line). Since these chips are intended for domestic units, which are more price sensitive, the overall size of the DMD has been reduced. Providing more chips on each silicon wafer allows the cost of each chip to be reduced. The size reduction is typically achieved by reducing the mirror size down from a nominal 17 micrometer pitch to 10.8 micrometers. The brightness of image, which is important to potential consumers of such systems, is primarily limited by the illumination of the DMD. Typical brightness desired in domestic systems are a few thousand lumens, but professional systems can exceed 20,000 ANSI Lumens. To achieve an equal brightness of previous 17 micrometers pitch systems with the 10.8 micrometer devices, it is necessary to concentrate the same amount of light onto a smaller area. This in turn means more heat per unit area is applied to the DMD device.

There are strict limits to the maximum temperature of the DMD and also limits on the temperature gradients across the DMD. Various techniques have been developed for cooling silicon chips, in the form of microprocessors, memories, and signal processing devices, see, for example, Colgan (U.S. Pat. No. 6,774,482), Park (U.S. Pat. No. 6,687,125) and Borkar (U.S. Pat. No. 5,978,228). However, these technologies are generally not capable of working with optical semiconductors onto which it is necessary to shine high intensity light. It is assumed in the three cited US specifications above that the front, back, and sides of the device can be covered with heat sinks or similar devices. This is not practicable for DMDs since the mirrors would be obscured.

The inventors in the present case have recognized the need to provide improved cooling for DMDs, without obscuring the face through which light is applied to the mirrors to enable the DMDs to be used for high brightness projectors.

The present invention, at least in preferred embodiments, relates to cooling processes and apparatus suitable for maintaining DMDs within recommended temperature parameters, whilst still achieving high brightness projected images.

SUMMARY OF THE INVENTION

Viewed from a first aspect, the present invention relates to apparatus for cooling a light valve device, the apparatus comprising an array of elongate members, the elongate members each having a tip for contacting the light valve device, wherein the tips of the elongate members in the array are offset from each other, the tips of a first set of elongate members in the array projecting a first distance and the tips of a second set of elongate members in the array projecting a second distance, the first distance being greater than the second distance. At least in preferred embodiments, the apparatus may allow the light valve device to be cooled without impairing its functionality. In use, the tips of each elongate member are in contact with the light valve device and may conduct heat away from the light valve device. Moreover, air may circulate between the elongate members allowing further cooling. Thus, at least in preferred embodiments, the apparatus according to the present invention may provide improved cooling of the light valve device employing both convection and conduction.

In use, the elongate members are preferably biased against the light valve device to help ensure that contact is maintained. The elongate members are preferably resilient and this resilience may bias the elongate members against the light valve device. To achieve the desired physical contact between the tip of each elongate member and the light valve device, the elongate members may, in use, be deflected by the light valve device. Typically, the elongate members may be deflected when the light valve device is installed in the apparatus. The elongate members are preferably not attached to the light valve device.

The tips of the elongate members may be in line with each other (i.e. the tips may define a substantially straight line) when they are not deflected. In this arrangement, when the light valve device is in position, the tips will engage the light valve device at a substantially uniform height. The array may comprise elongate members having substantially the same length.

Alternatively, the tips of the elongate members may project by different amounts. For example, the tips may define a generally sinusoidal, saw-tooth, triangular, square or stepped wave form when they are in an un-deflected state. In this arrangement, when the light valve device is in position.

The tips of the elongate members project by different amounts. For example, the tips may define a generally sinusoidal, saw-tooth, triangular, square or stepped wave form when they are in an un-deflected state. In this arrangement, when the light valve device is in position, the tips of the elongate members will engage the light valve device at different heights. the light valve This offset may promote circulation of air around the elongate members.

The array may comprise elongate members having different lengths. In such an arrangement, the tips of elongate members having different lengths are offset from each other and engage the light valve device at different heights. Preferably the array consists of elongate members having first and second lengths. In other words, a first set of the elongate members making up the array may be a first length and a second set of the elongate members in the array may be a second length. When the light valve device is located in the apparatus, the tips of elongate members having first and second lengths engage the light valve device at a two different heights. Preferably, one or more elongate members of a first length are provided between elongate members of a second length. Most preferably, the elongate members of said first and second lengths are arranged alternately.

Preferably, in use, a point contact may be made between the elongate member and the light valve device. This arrangement allows air to circulate proximal the contact point and, at least in preferred embodiments, may facilitate heat transfer. The tip of each elongate member may be pointed. Preferably, however, each tip is rounded and a point contact is made between the rounded tip and the light valve device.

In order to increase the number of contact points between the elongate members and the light valve device, two or more projections may be provided at the tip of each elongate member. The projections are preferably rounded. A gap is preferably provided between the projections.

A recess or indent may be formed in the tip of each of the elongate members. Again, this may improve airflow around the tip of the elongate member.

The elongate members in the array are preferably arranged substantially parallel to each other. The array preferably comprises at least fifteen (15), twenty (20) or more elongate members to attain good cooling uniformity.

A gap is preferably provided between adjacent elongate members in the array. This gap may allow air to circulate between the elongate members.

Although the apparatus may consist of a single array of elongate members, preferably the apparatus comprises a plurality of arrays. The arrays are preferably arranged such that, in use, each array may contact a respective side of the light valve device. Preferably, the arrays form a frame for the light valve device. The arrays may substantially surround the light valve device.

The elongate members preferably project inwardly. An aperture for receiving the light valve device may be defined by a plurality of said arrays. The elongate members preferably project inwardly into said aperture. An array of the elongate members is preferably provided on each side of the aperture. Preferably, the shape of the aperture generally matches the shape of the light valve device. The aperture may be rectangular.

The elongate members in several arrays may cooperate to help retain the light valve device in position. For example, first and second arrays may be diametrically opposed to each other for engaging opposite sides of the light valve device.

Equally, third and fourth arrays may be diametrically opposed to each other for engaging opposite sides of the light valve device.

The arrays of elongate members may be arranged in a single layer. Preferably, however, arrays of the elongate members are arranged in a plurality of layers. The arrays may be arranged in two, three or more layers. The layers may be spaced apart from each other, for example in a vertical direction. A flow of air, for example from a fan, may be directed between the layers.

The elongate members are preferably resilient or springy. In use, the resilience of the elongate members may bias them against the light valve device.

The apparatus may also comprise alignment means. Advantageously, the alignment means may align the apparatus with the light valve device during assembly.

The apparatus may comprise a duct for directing airflow from a fan to the light valve device. The arrays of elongate members may be formed integrally with said duct. For example, elongate members may be formed integrally with one or more sidewalls of the duct.

The duct is preferably arranged to direct the flow of air onto a side of the light valve device at an angle less than 90° and preferably less than 60°. Preferably, the duct is arranged to direct the flow of air onto a side of the light valve device at an angle of approximately 45°. This may help the circulation of air around the light valve device. Most preferably, the duct is arranged to introduce a flow of air at a corner of the light valve device. The airflow may be split by the light valve device and travel along two adjacent sides of the light valve device. The apparatus may comprise two or more ducts for directing airflow to the light valve device.

At least one guide vane may be provided in said duct. The at least one guide vane may define separate passages within the duct. A bend may be formed in the duct. The at least one guide vane preferably extends around the bend. The guide vanes may help reduce energy losses and maintain uniformity of airflow as the air flows around any such bend to help cooling of the light valve device.

A section of the duct may be tapered. The taper preferably reduces the cross-sectional area of said section of the duct in a direction towards the array(s) of elongate members (i.e. in the direction of airflow through the duct when in use). The tapered section may form a tapered collar. The tapered section is preferably provided at an inlet end of the duct. In use, the tapered section accelerates the airflow from the fan.

An outer surface of the duct may be coloured black. Equally, an outer surface of part or all of the apparatus may be black. This may be achieved by blackening the material from which the apparatus or duct is made using an appropriate process.

Viewed from a further aspect, the present invention relates to apparatus for cooling a light valve device, the apparatus comprising an array of elongate members, wherein the elongate members each have an unsupported end for contacting the light valve device.

The light valve device is preferably a digital micro-mirror device (DMD).

Viewed from a further aspect, the present invention relates to an assembly comprising a digital micro-mirror device, a fan and a duct; wherein the duct is arranged, in use, to direct airflow from the fan onto at least one side of the digital micro-mirror device. The incident airflow is preferably directed onto said at least one side of the digital micro-mirror device at an angle less than 90° and preferably between 30° and 60° Viewed from a further aspect, the present invention relates to apparatus for cooling a light valve device, the apparatus comprising an array of elongate members, the elongate members each having a tip for contacting the light valve device, the apparatus further comprising a duct for directing airflow from a fan to the light valve device, wherein a section of said duct is tapered.

Viewed from a still further aspect, the present invention relates to apparatus for cooling a light valve device, the apparatus comprising an array of elongate members, the elongate members each having a tip for contacting the light valve device, the apparatus further comprising a surround for optically shielding the light valve device.

The airflow may exit the duct through an outlet located proximal the digital micro-mirror device. Preferably, the outlet is provided at a corner of the digital micro-mirror device and, in use, the airflow is directed onto two adjacent sides of the digital micro-mirror device.

Viewed from a further aspect, the present invention relates to a digital micro-mirror device having a front, a back and a plurality of sidewalls, optical access to a plurality of micro-mirrors being provided on the front of the light valve device and a gasket being mounted on the front of the light valve device; wherein at least one of the sidewalls is exposed to facilitate cooling. The at least one exposed sidewall is uncovered and bare to the air. Preferably, substantially all of the sidewalls of the light valve device are exposed.

BRIEF DESCRIPTION OF DRAWINGS

A preferred embodiment of the present invention will now be described, by way of example only, with reference to the accompanying drawings, in which.

DETAILED DESCRIPTION OF A PREFERRED EMBODIMENT

Figure 1:
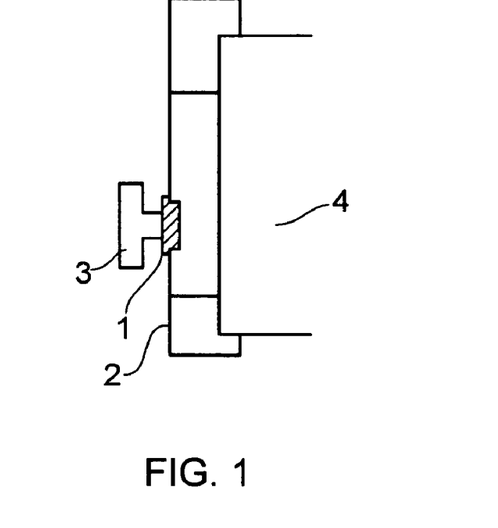
FIG. 1 shows schematically a conventional mounting arrangement for a digital micro-mirror device.

A prior art mounting assembly for a digital micro-mirror device (DMD) 1 in a conventional projection system is illustrated in FIG. 1. The DMD 1 is mounted on a plate 2 and a stud 3 is provided on a back face thereof to help conduct heat away from a DMD heatsink. The DMD 1 is proximal a prism 4, necessary for combining the Red, Green, and Blue light into the output beam.

The DMD 1 is packaged in such a way to exclude dust. This is particularly important at a 10.8 micrometer pitch since a given size of dust particle appears approximately 80% bigger on a projection screen than for a 17 micrometer pitch. Thus dust which may not have been objectionable with older chips is now unacceptable. To avoid dust settling on DMDs, they may be packaged in a hermetic enclosure with a window and this is arranged into a sealed enclosure typically formed using gaskets.

Conventional DMD packaging also comprises a light shield 5. This light shield is primarily to prevent light other than image forming light falling on the DMD 1. This stray light, if it were to fall on the DMD 1, would not contribute to the imaging, and would cause additional heating. Thus, a light shield, not in contact with the DMD surface is typically used.

Figure 2:
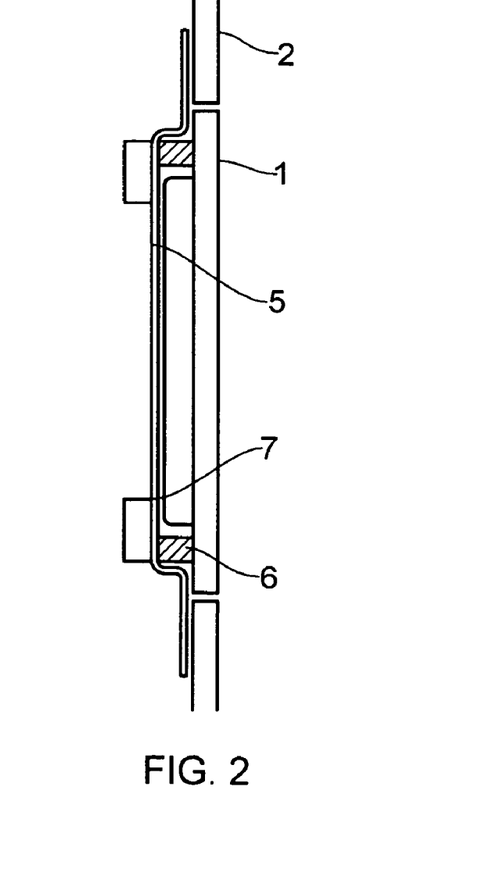
FIG. 2 shows the position of a light shield in the arrangement of FIG. 1.

The mounting of a DMD 1 relative to the prism 4 is illustrated in FIG. 2. The light shield 5 extends between an inner gasket 6 and a prism gasket 7. It will be appreciated that cooling air (if supplied) cannot reach the face of the DMD 1. Instead, it will only cool the edge of the DMD 1 and the outside edge of the inner sealing gasket. Gasket materials, apart from preventing air flow, are usually very good heat insulators. Therefore the DMD 1 in this configuration may get hot and may exceed the manufacturer's recommendations for temperature exposure, particularly when attempting to reach high brightness levels.

Figure 3:
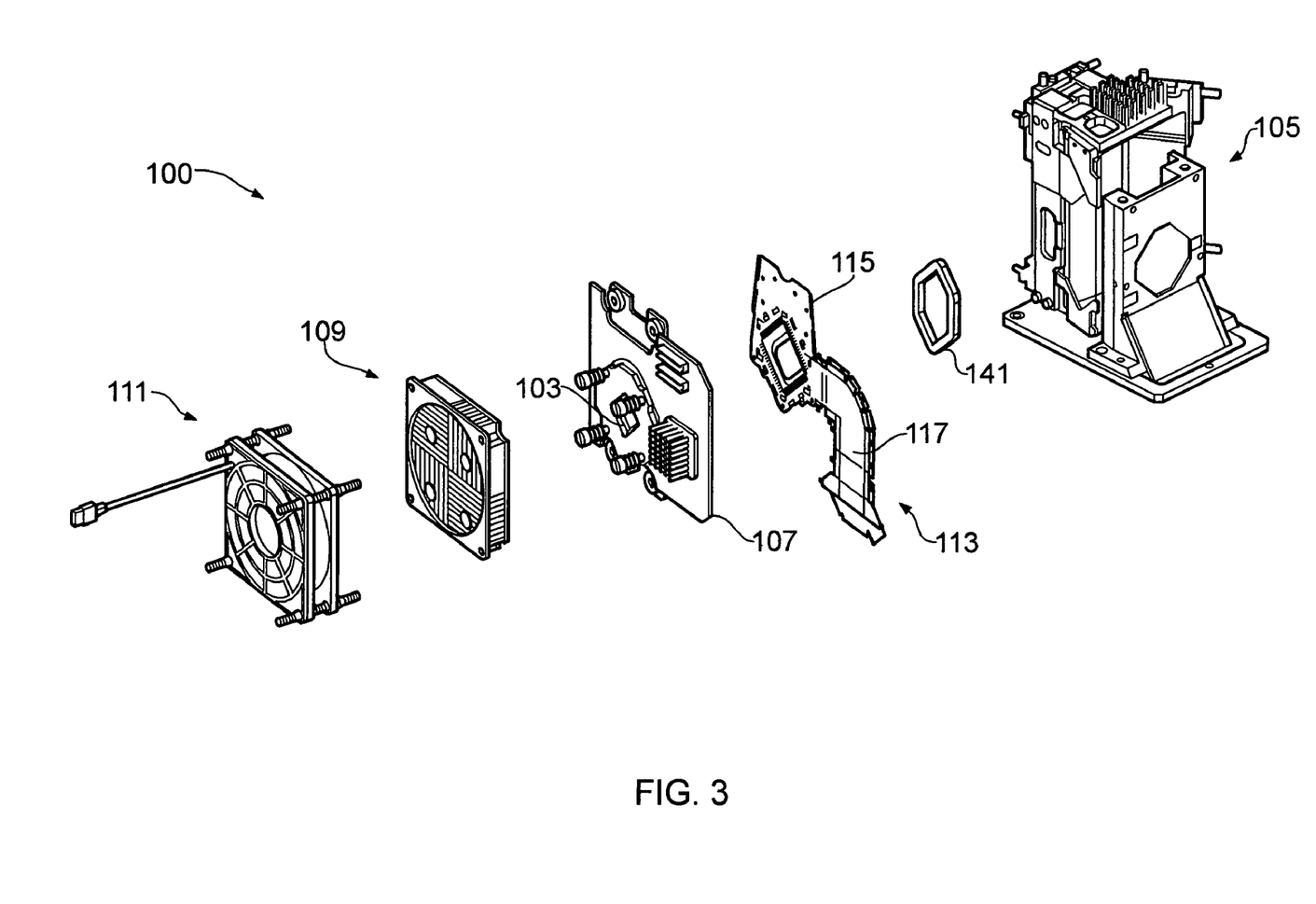
FIG. 3 shows an exploded isometric view of the DMD mounting assembly in accordance with an embodiment of the present invention.

An exploded perspective view of a preferred embodiment of a cooling assembly 100 for a DMD 103 to be used in a projection system (not shown) in accordance with the present invention is shown in FIG. 3. A plurality of micro-mirrors is provided on a front face of the DMD 103 for reflecting light to a prism (not shown) provided in a prism assembly 105. The DMD 103 in combination with the prism provides colour video projection suitable for use in a home cinema projector or the like. A typical DMD 103 is model 1272-022b supplied by Company Texas Instruments of Dallas Tex. USA; although this example is not a 1080p device it is physically similar.

The DMD 103 is mounted on a carrier board 107 and arranged such that the micro-mirrors are directed towards the prism in the prism assembly 105. A heat sink 109 is mounted on a back face of the DMD 103 and a first axial fan 111 is provided for blowing air over the heat sink 109.

A heat exchange assembly 113 is provided between the carrier board 107 and the prism assembly 105. In use, the heat exchange assembly 113 cools the DMD 103 by a combination of conduction and convection. The heat exchange assembly 113 comprises a surround 115 and a duct 117. The surround 115 extends around the DMD 103; and the duct 117 is connected to a second fan, typically a centrifugal type (not shown).

A rectangular aperture 118 is formed in the surround 115 for receiving the DMD 103. A plurality of inwardly projecting elongate members or fingers 119 are provided around the edge of the aperture 118. The elongate members 119 are arranged to touch the sidewalls of the DMD 103 when the surround 115 is fitted in position. The heat exchange assembly 113 and the elongate members 119 will now be described in more detail.

Figure 4A:
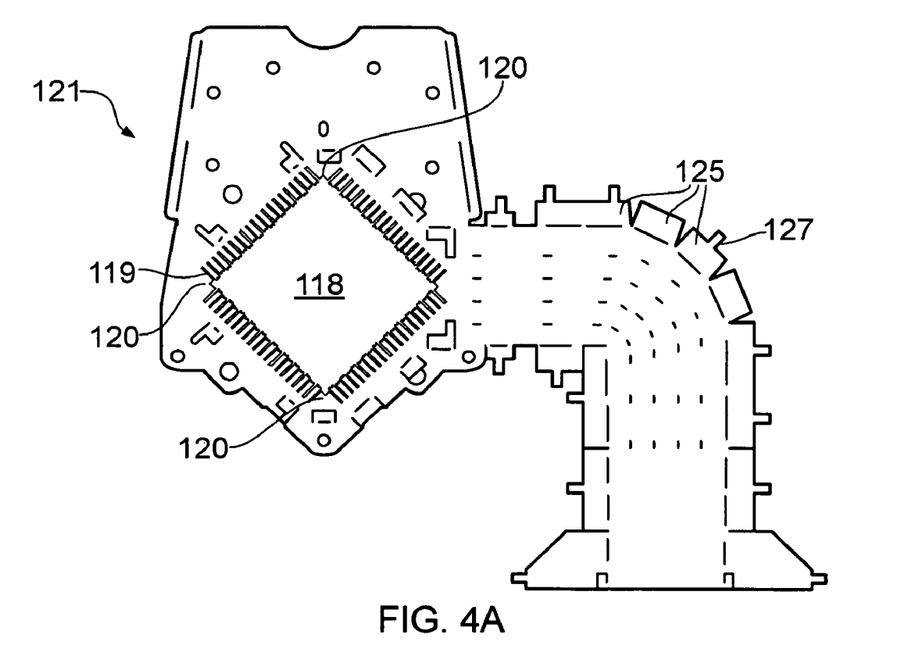
FIGS. 4A and 4B show the blanks for the sheet components used to form the surround and ducting for the DMD.
Figure 4B:
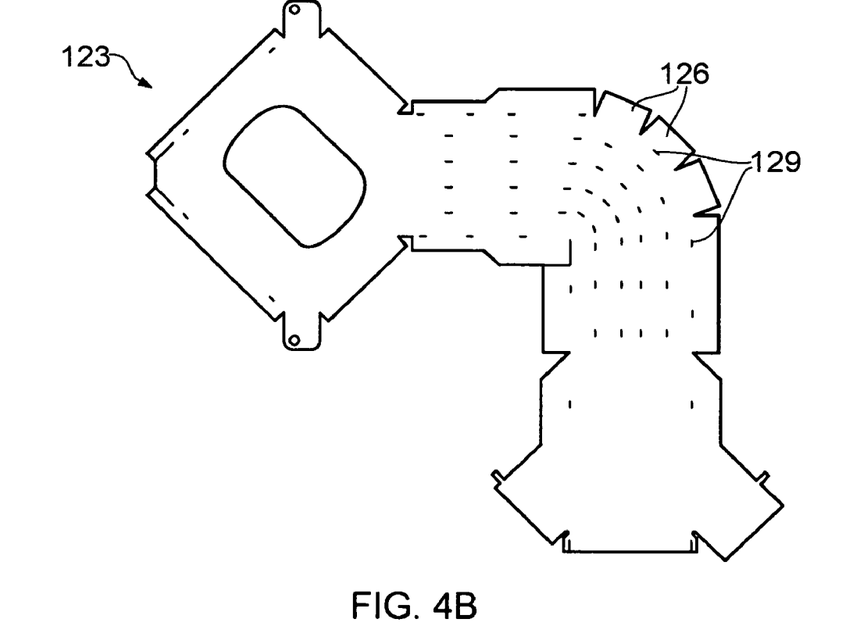

The heat exchange assembly 113 comprises first and second sheet members 121, 123. The blanks for the first and second sheet members 121, 123 are shown in FIGS. 4A and 4B respectively. As shown in FIG. 4A, the first sheet member 121 is provided with a first series of panels 125 foldable to form the sidewalls of the duct 117. As shown in FIG. 4B, the second sheet member 123 has a second series of foldable panels 126 which locate outside the panels 125 on the first sheet member 121. The panels 125 are provided with fixing tabs 127 locatable in slots 129 provided in the second sheet member 123. The fixing tabs 127 are then bent over to lock the sheet members 121, 123 together. The sheet members 121, 123 both contain fold creases, and can be folded to form the duct 117.

The first and second sheet members 121, 123 are made of heat conducting material. The first member 121 is made from a resilient material such as Beryllium Copper or fully hard Copper so that the tips of the elongate members 119 are biased against the sidewalls of the DMD 103 to help ensure a good thermal contact is established. The second member 123 is made from soft copper for easy forming. Both may be cut out using photo-etching techniques.

As shown in FIG. 4A, the elongate members 119 are formed integrally with the first sheet member 121. The elongate members 119 are arranged in four arrays, each array being associated with a respective side of the DMD 103. In each array there are typically twenty (20) elongate members 123 arranged substantially parallel to each other. The elongate members 119 each have a tip 131 provided at their free (i.e. unsupported) end to contact the sidewalls of the DMD 103. Alignment tabs 120 are provided at the corners of the aperture 118 to align the heat exchange assembly 113 with the DMD 103.

The arrays each consist of elongate members 119 of two different lengths, one longer than the other. The long and short elongate members 119 are arranged alternately along the length of the array. Thus, when they are not deflected, the tips 131 of the elongate members 119 define a step wave along each array.

Figure 5:
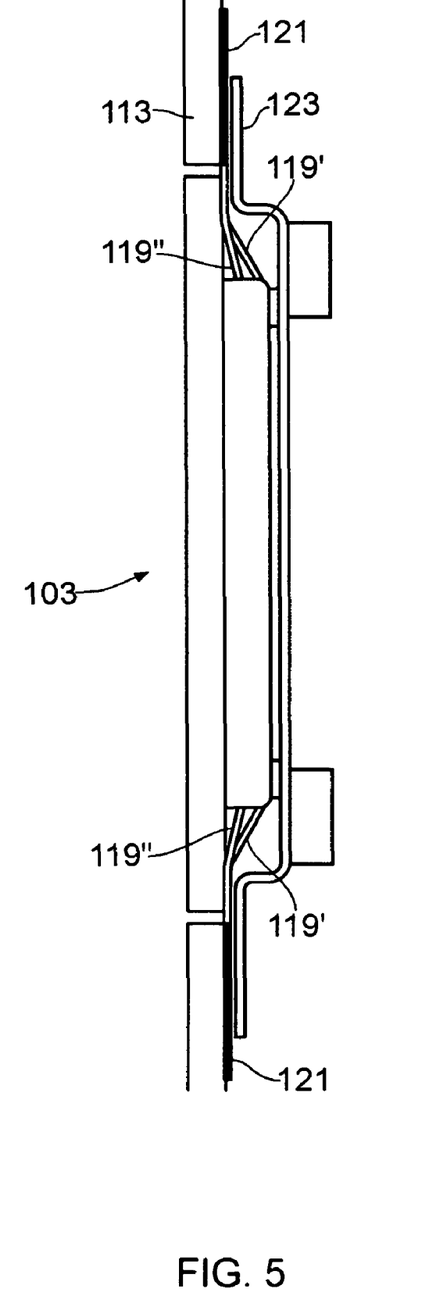
FIG. 5 shows a side view of the deflected elongate members contacting the DMD in accordance with the present invention.

The heat exchange assembly 113 is fitted over the DMD 103. The tips 131 of the elongate members 119 engage the sidewalls of the DMD 103 causing the elongate members 119 to deflect. Due to their differing lengths, the elongate members 119 form two distinctly positioned rows when the heat exchange assembly 113 is positioned over the DMD 103. As shown in FIG. 5, the longer elongate members 119' make contact higher up the sidewall of the DMD 103, whilst the shorter elongate members 119" make contact lower down on the sidewall of the DMD 103. This offset arrangement of the elongate members 119 in each array induces turbulence in the flow of air around the DMD 103 and may help to increase the resulting cooling effect.

Figure 6:
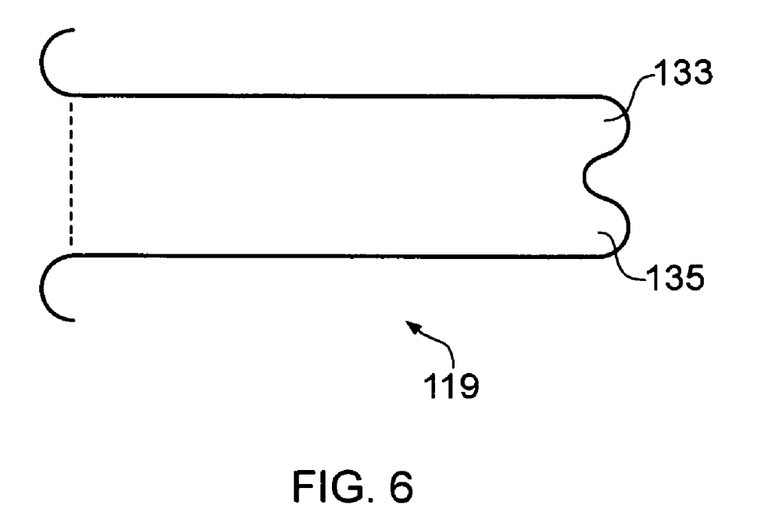
FIG. 6 shows an enlarged plan view of one of the elongate members for contacting the DMD.

As illustrated in FIG. 6, the tips 131 of the elongate members 119 are shaped such that two protrusions 133, 135 are provided for contacting the DMD 103. The protrusions 133, 135 are ball-shaped or rounded in plan form. A gap is provided between the protrusions 133, 135 to allow air to circulate between them. This gap further ensures air circulation around the end of the elongate members 119, creating local turbulence against the casing of the DMD 103 and aiding heat transfer direct to the airflow in addition to the heat conducted along each finger and coupled into the airflow in the conventional way.

The heat exchange assembly 113 in the present embodiment comprises four arrays of elongate members 119 arranged in a single layer. However, the elongate members 119 could readily be provided in two, three or more layers as desired. The layers of elongate members 119 could each be provided on a separate sheet member and the sheet members spaced apart from each other.

The surround 115 can further be used to cool the DMD 103 by making it oversized, as this may help prevent other stray light and heat from impacting on the carrier board 107 and being conducted to the DMD 103. Preferably, the surround 115 is black to allow light falling in the region to be absorbed more efficiently and so to improve contrast. A chemical blackening process is preferably used to blacken the copper as the resultant coating is more durable than more commonly used paint finishes. Typical thickness of copper used is this system is 0.3 mm, although other thicknesses can be used. The use of hard rolled Copper which has some springiness is also practical here but being less springy than Beryllium Copper the contact strength of the fingers to the DMD case is lower and has been found to be less effective.

In use, the deflected elongate members cause air turbulence, when air passes over them. This turbulence cools the elongate members, which may conduct more heat from the DMD 103.

To direct air over the DMD 103 and the elongate members 125 it is advantageous to introduce air at a corner of the DMD 103, although the air could be introduced directly onto one or more of the sidewalls of the DMD 103. To direct the airflow optimally, the duct 117 is arranged such that an outlet is located proximal a corner of the DMD 103. The duct 117 is formed integrally with the surround 115. A small blower fan (not shown) is fitted at an inlet to the duct 117.

Figure 7:
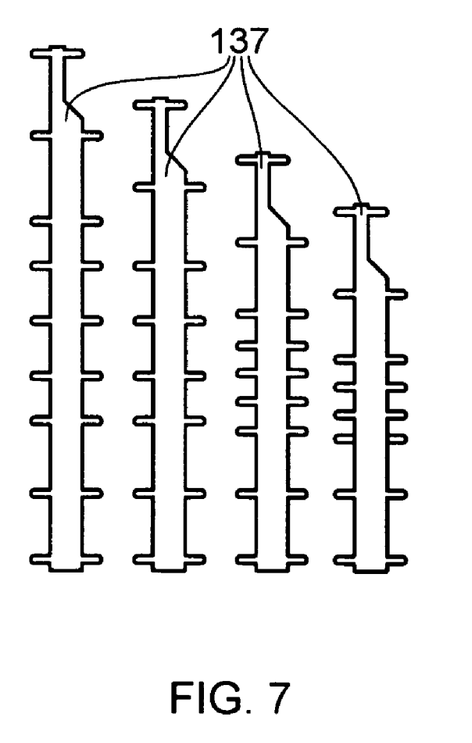
FIG. 7 shows a plan view of the guide vanes locatable in the DMD cooling assembly.
Figure 8:
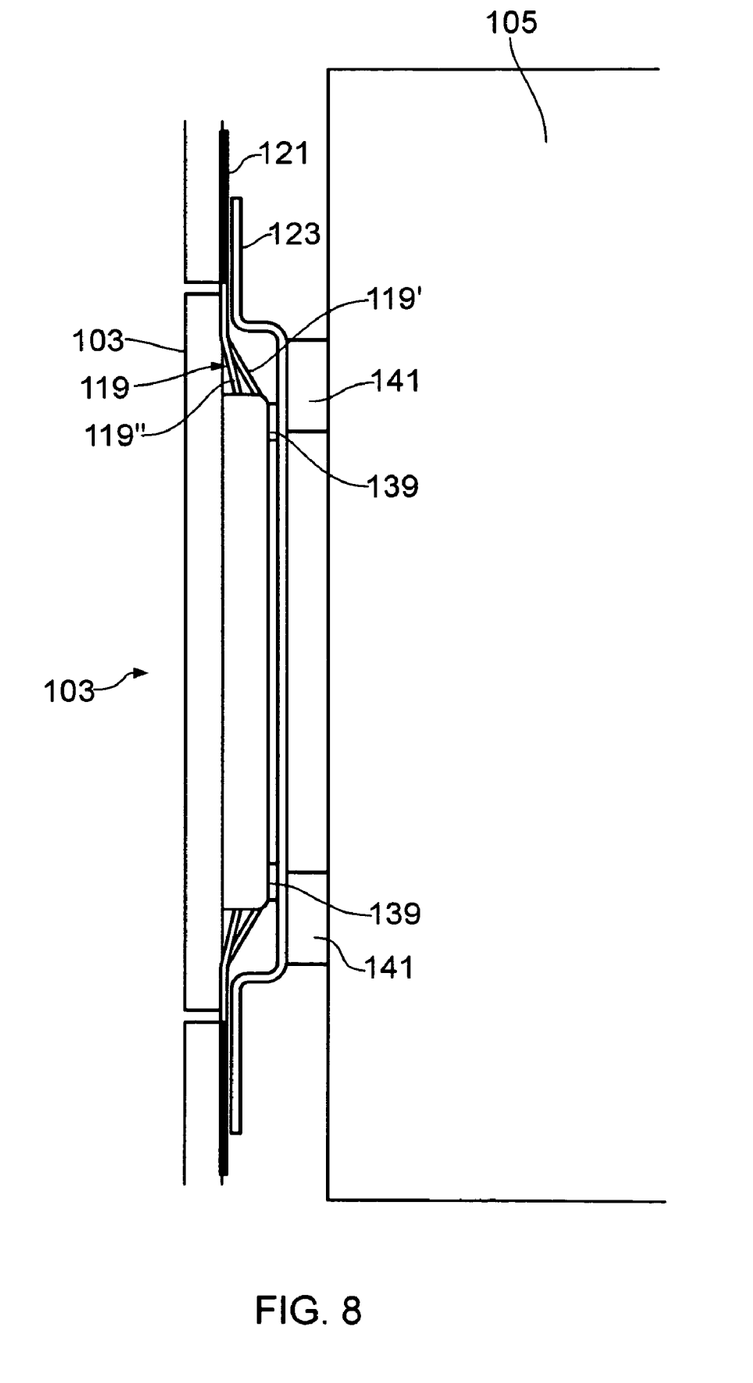
FIG. 8 shows a side of the mounting arrangement of the DMD in accordance with an embodiment of the present invention.

The duct 117 bends in two directions to allow air to be directed to the surround 115 and the DMD 103. This arrangement may be appropriate since prism areas are commonly tightly packed with other components, and are difficult to access. These bends are necessary in the present embodiment to supply cooling air to the DMD 103, but it will be understood that they are not fundamental to the cooling concepts disclosed herein and may be omitted in other devices. The airflow through the duct 117 tends to become uneven at the bends. To counteract this, guide vanes 137 are provided internally in the duct 117 to help ensure more even airflow around the bends. The guide vanes 137 can be also photo-etched out of copper sheet. As shown in FIG. 8, the guide vanes 137 are provided with fixing tabs that fit into slots formed in the first and second sheet members 121, 123 to secure the guide vanes 137 in position. Typically three or five guide vanes 137 are used. It is not necessary to blacken the guide vanes 137.

Further cooling of the DMD 103 may be achieved by repositioning the cooling gaskets. It will be understood that the inner gasket 6 in the prior art arrangement of FIG. 2 shields the sides of the DMD 1 and may provide unwanted thermal insulation. A modified arrangement in accordance with a preferred embodiment of the present invention is illustrated in FIG. 8. In this arrangement, the inner gasket 6 has been removed and a replacement front gasket 139 provided between the front face of the DMD 103 and the second sheet member 123. The front gasket 139 allows air to flow along the sides of the DMD 103 and even on a small portion of the top face.

Figure 9A:
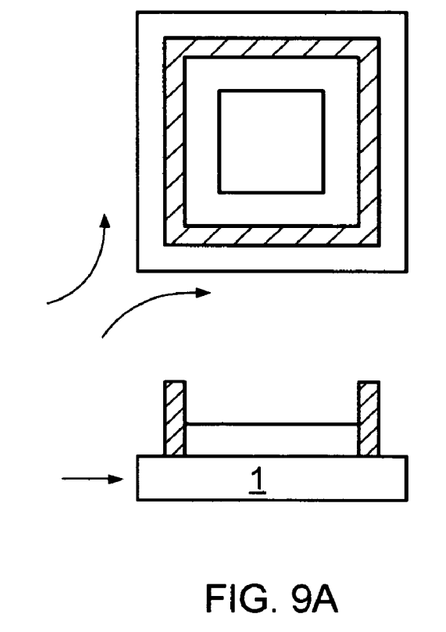
FIGS. 9A and 9B illustrate the airflow around a conventional DMD assembly and a DMD mounted in accordance with the present invention.
Figure 9B:
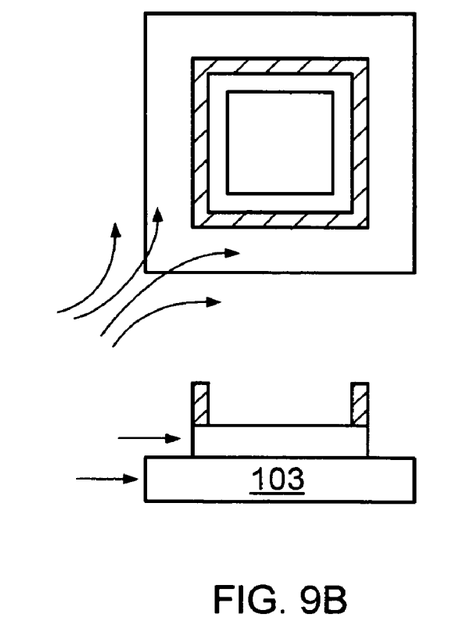

The front gasket 139 may be mounted on the inside of the surround 115. The second sheet member 123 can act in place of the light shield 5. Furthermore, a prism gasket 141 is mounted on the outside of the surround 115. The airflow around the DMD 1 in the prior art arrangement is illustrated in FIG. 9A. In this arrangement, the front face of the DMD 1 is shielded and cooling air flows around the outside of the inner gasket 6. In contrast, as illustrated in FIG. 9B, the front gasket 139 allows cooling air to flow around the sides of the DMD 103 and over a portion of its front face.

Figure 10:
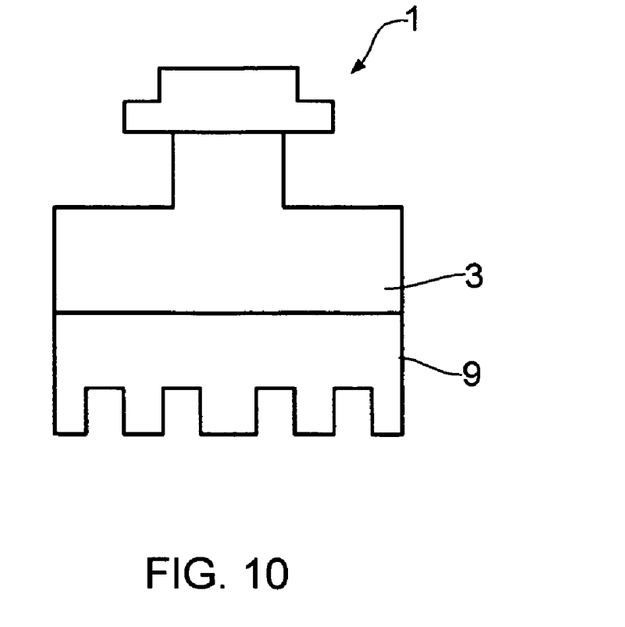
FIG. 10 shows a prior art arrangement of a DMD mounted on a stud having a heat sink.

It is common practice to attach a heat sink to a stud provided on the back of a DMD (the side on which light does not fall) to cool it. Such heat sinks need to be small and light (as there is an imposed maximum mass that can be fitted to DMDs) and preferably efficient. A conventional heat sink 9 and integrated stud 3 mounted on a DMD 1 is illustrated in FIG. 10.

Figure 11:
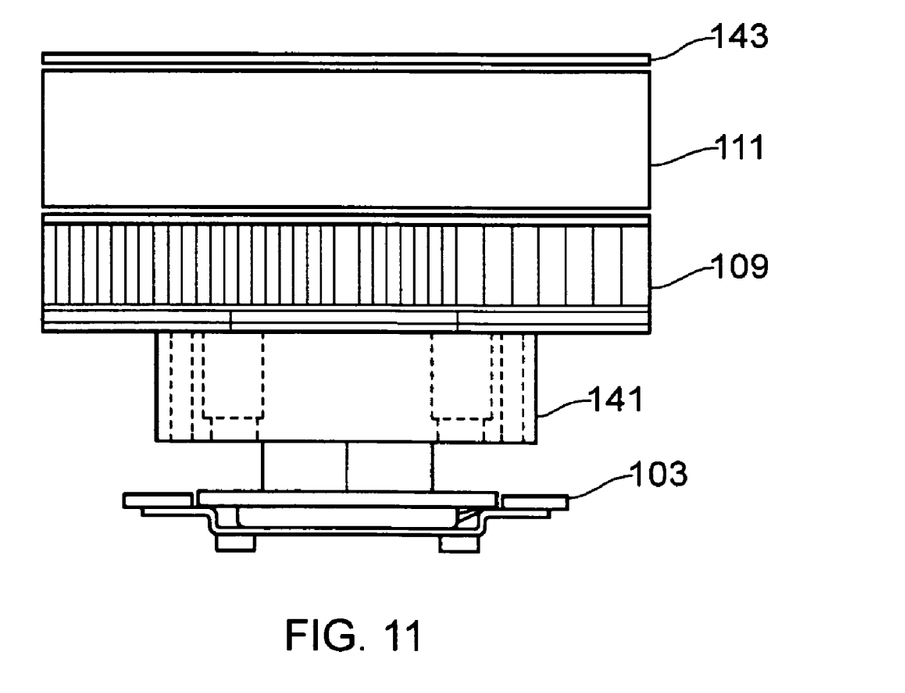
FIG. 11 shows a side view of the heat sink attached to the DMD mounting assembly.

The efficiency of the heat sink may be further increased by blowing air over it and there are a number of methods for achieving this. The mounting arrangement of the heat sink 109 in accordance with the present invention is illustrated in FIG. 11.

A stud 141 is provided on the back of the DMD 103. The heat sink 109 is mounted on the stud 141 and the first fan 111 provided for directing airflow over the heat sink 109. A grille 143 is provided over the inlet of the first fan 111 to help prevent debris being drawn into the fan 111.

Figure 12:
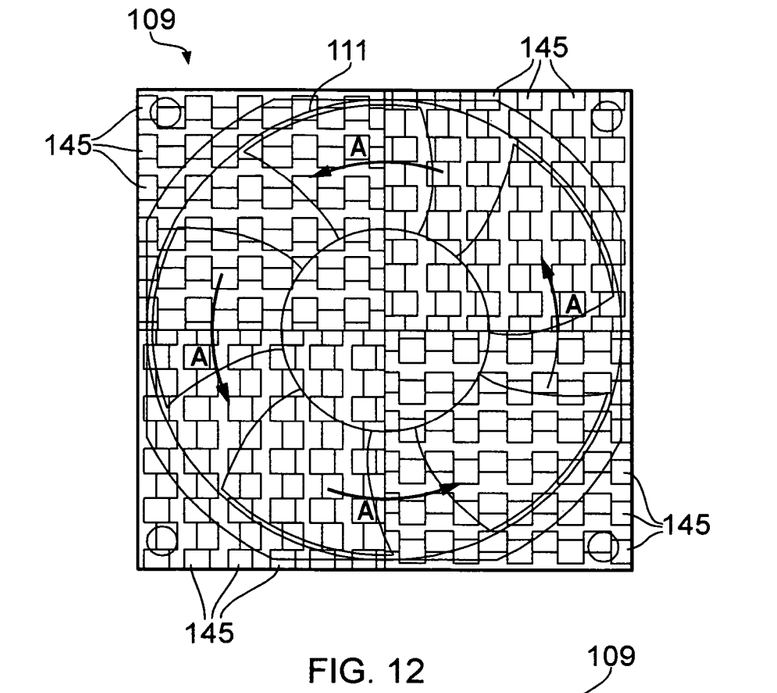
FIG. 12 shows a plan view of the heat sink of FIG. 11.

As shown in FIG. 12, the heat sink 109 is provided with a plurality of fins 145. The fins may be substantially planar but in the present embodiment are corrugated. As illustrated in FIG. 12, the fins 145 are arranged in four quadrants. The fins 145 provided in each quadrant are substantially parallel to each other but are arranged perpendicular to those fins 145 in an adjacent quadrant. The first fan 111 is an axial fan and the resulting airflow tends to travel along a helical path. Thus, the airflow incident on the heat sink 109 has a rotational component, as indicated by the arrows A. It will be appreciated that the airflow rotates in the same direction as the fan 111 (anti-clockwise in the present case).

The centre of the heat sink 109 is aligned with a central axis of the axial fan 111. The fins 145 are arranged to guide the incident airflow from the fan 111 outwardly (i.e. towards an edge of the heat sink 109) to help transport warm air away from the heat sink 109. The fins 145 are preferably matched to the direction of rotation of the first fan 111. In particular, the fins 145 in each quadrant are arranged substantially parallel to the direction of the airflow as it enters that quadrant. The direction of airflow in each of the quadrants, as determined by the orientation of the fins 145, is illustrated schematically in FIG. 13 by the arrows B.

Figure 13:
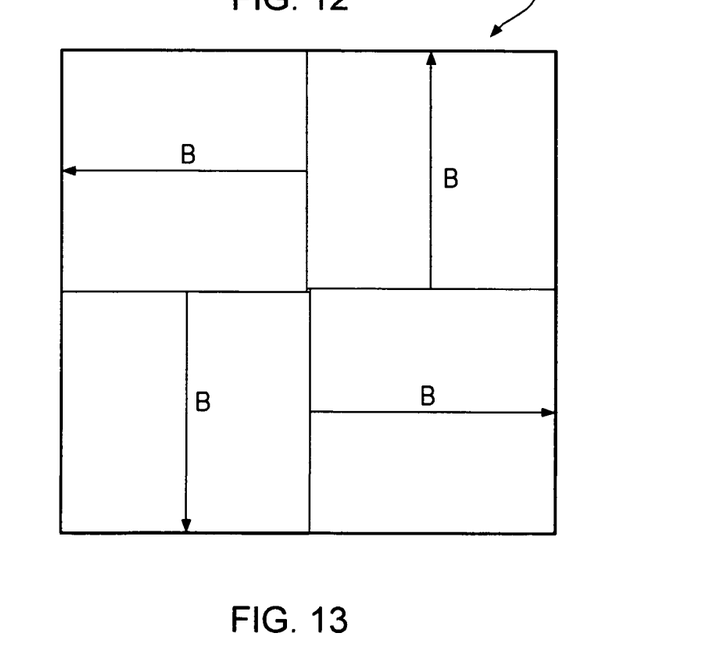
FIG. 13 shows schematically the airflow over the heat sink.

In the present case, the direction of circulated air from the fan is seen to be guided into channels in quadrants of different orientations. Further advanced geometric shapes, featuring six or eight fold symmetries could similarly be used.

Although the heat sink 109 is shown as being substantially square, it may be other shapes, such as a circle, ellipse or a polygon having five, six, seven or more sides.

Figure 14:
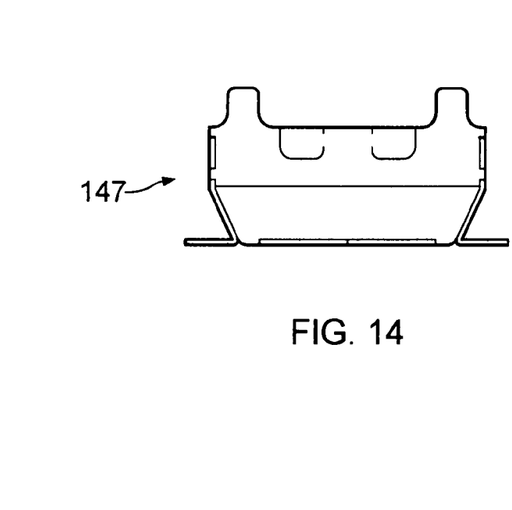
FIG. 14 shows a side view of a tapered collar in accordance with a modified version of the preferred embodiment of the present invention.
Figure 15:
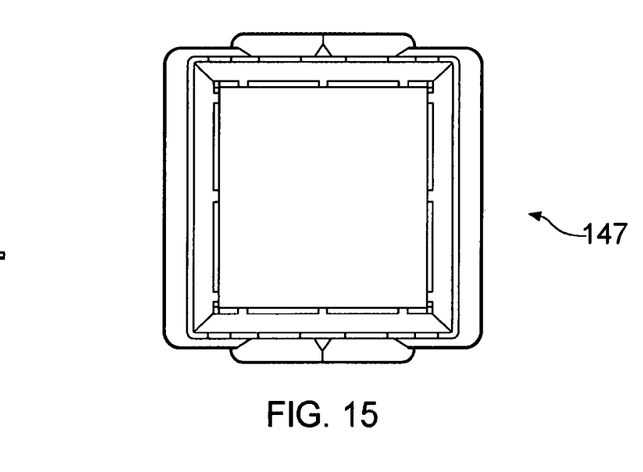
FIG. 15 shows a plan view of the tapered collar of FIG. 14.
Figure 16:
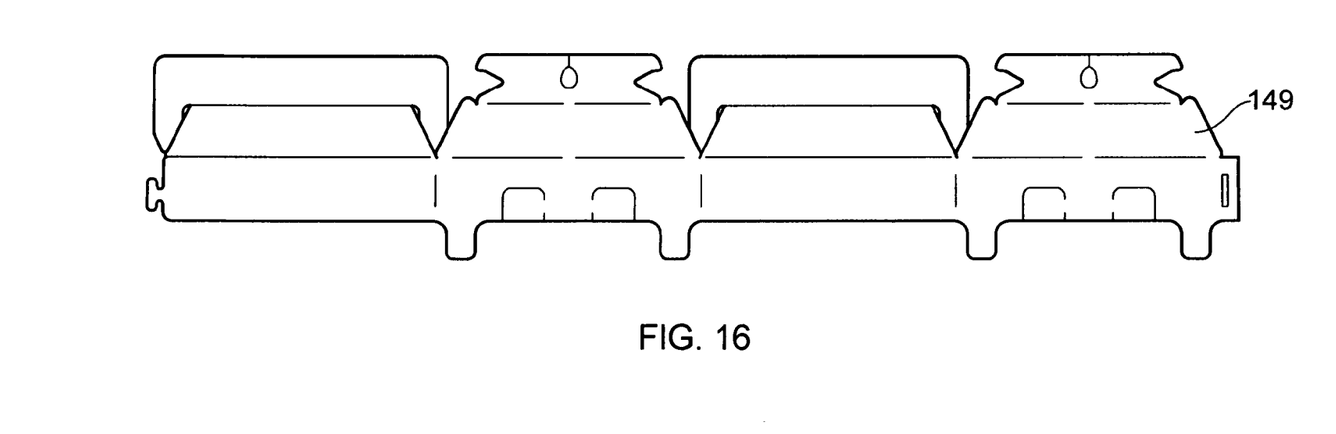
FIG. 16 shows a blank for forming the tapered collar illustrated in FIGS. 14 and 15.

A tapered collar 147 may be provided between the heat sink 109 and the first fan 111. A collar for use in accordance with the present invention is illustrated in FIGS. 14 and 15. The collar 147 tapers towards the heat sink 109. Advantageously, this enables a fan 111 having a diameter larger than the heat sink 109 to be employed. The use of a tapered collar 147 in conjunction with a cooling fan is believed to be independently patentable. The tapered collar 147 may be formed from a sheet material. A blank 149 for forming the collar 147 is shown in FIG. 16.

In summary, at least in preferred embodiments, the present application provides a series of improvements to cool heat generating devices that typically have to have one side of the device that cannot be contacted by mechanical cooling processes. The improvements may also provide further cooling of the device, and a system implementing all of them may provide improved cooling.

Although the present invention has been described with particular reference to digital micro-mirror devices, it will be appreciated that the techniques and apparatus may be used in other broader applications. The apparatus and techniques may be used to cool other forms of optical switches and light valves. The optical switches or light valves may be reflective or transmissive. An alternative to digital micro-mirror devices is, for example, a reflective liquid crystal display (LCD).

The skilled person will appreciate that various changes and modifications may be made to the apparatus described herein without departing from the spirit and scope of the present invention.

The invention claimed is:

1. Apparatus for cooling a light valve device, the apparatus comprising an array of elongate members, the elongate members each having a tip for contacting the light valve device;
   wherein the tips of the elongate members in the array are offset from each other, the tips of a first set of elongate members in the array projecting a first distance and the tips of a second set of elongate members in the array projecting a second distance, the first distance being greater than the second distance.

2. Apparatus as claimed in claim 1, wherein one or more elongate members in said first set are provided between elongate members in said second set.

3. Apparatus as claimed in claim 1, wherein two or more projections are provided at the tip of each elongate member for contacting the light valve device.

4. Apparatus as claimed in claim 1, wherein the elongate members in said array are substantially parallel to each other.

5. Apparatus as claimed in claim 1, wherein the elongate members are resilient, in use, to bias the elongate members against the light valve device.

6. Apparatus as claimed in claim 1 further comprising a duct for directing airflow from a fan to the light valve device.

7. Apparatus as claimed in claim 6, wherein the duct is arranged, in use, to supply a flow of air around the sides of the light valve device.

8. Apparatus as claimed in claim 6, wherein the duct is arranged to introduce said airflow at a corner of the light valve device.

9. Apparatus as claimed in claim 6, wherein a bend is formed in said duct.

10. Apparatus as claimed in claim 6, wherein one or more guide vanes are provided in said duct.

11. Apparatus as claimed in claim 6, wherein a section of said duct is tapered.

12. Apparatus as claimed in claim 1, wherein an outer surface of the apparatus is coloured black.

13. Apparatus as claimed in claim 1 comprising a surround for optically shielding the light valve device.

14. Apparatus as claimed in claim 1, wherein the light valve device is a digital micro-mirror device (DMD).

15. Apparatus as claimed in claim 1 in combination with a light valve device.

16. Apparatus for cooling a light valve device, the apparatus comprising an array of elongate members, the elongate members each having a tip for contacting the light valve device;
   wherein the tips of the elongate members project by different amounts and, in use, engage the light valve device causing the elongate members to deflect and the tips to engage the light valve device at different heights to promote the circulation of air around the elongate members.

17. Apparatus for cooling a light valve device, the apparatus comprising an array of elongate members, the elongate members each having a tip for contacting the light valve device, the apparatus further comprising a duct for directing airflow from a fan to the light valve device, wherein a section of said duct is tapered.

18. Apparatus for cooling a light valve device, the apparatus comprising an array of elongate members, the elongate members each having a tip for contacting the light valve device, the apparatus further comprising a surround for optically shielding the light valve device.

* * * * *